United States Patent
Slade

(10) Patent No.: US 12,394,540 B2
(45) Date of Patent: Aug. 19, 2025

(54) HIGH TEMPERATURE SUPERCONDUCTOR CABLE

(71) Applicant: Tokamak Energy Ltd, Abingdon (GB)

(72) Inventor: Robert Slade, Abingdon (GB)

(73) Assignee: Tokamak Energy Ltd, Abingdon (GB)

( * ) Notice: Subject to any disclaimer, the term of this patent is extended or adjusted under 35 U.S.C. 154(b) by 620 days.

(21) Appl. No.: 17/600,693

(22) PCT Filed: Apr. 3, 2020

(86) PCT No.: PCT/EP2020/059638
§ 371 (c)(1),
(2) Date: Oct. 1, 2021

(87) PCT Pub. No.: WO2020/201540
PCT Pub. Date: Oct. 8, 2020

(65) Prior Publication Data
US 2022/0172863 A1    Jun. 2, 2022

(30) Foreign Application Priority Data
Apr. 3, 2019    (GB) .................................... 1904665

(51) Int. Cl.
*H01B 12/06*    (2006.01)
*G21B 1/05*     (2006.01)
*H01F 6/06*     (2006.01)

(52) U.S. Cl.
CPC ............. *H01B 12/06* (2013.01); *G21B 1/057* (2013.01); *H01F 6/06* (2013.01)

(58) Field of Classification Search
CPC ............ H01F 6/06; G21B 1/057; H01B 12/06
See application file for complete search history.

(56) References Cited

U.S. PATENT DOCUMENTS

| | | | | |
|---|---|---|---|---|
| 2001/0056041 A1* | 12/2001 | Jia | ........................ | H10N 60/203 257/E39.011 |
| 2012/0065074 A1* | 3/2012 | Xie | ...................... | H10N 60/203 228/256 |
| 2017/0236623 A1 | 8/2017 | Jin et al. | | |

(Continued)

FOREIGN PATENT DOCUMENTS

| | | |
|---|---|---|
| GB | 2510447 A | 8/2014 |
| JP | 2005085612 A | 3/2005 |
| JP | 2010003435 A | 1/2010 |

(Continued)

OTHER PUBLICATIONS

Japanese Patent Office Action for Application No. 2021558749 dated Dec. 25, 2023 ( 9 pages including English translation).

(Continued)

*Primary Examiner* — Paul A Wartalowicz
(74) *Attorney, Agent, or Firm* — Michael Best & Friedrich LLP

(57) ABSTRACT

A cable for carrying electrical current in a coil of a magnet. The magnet comprises an HTS transport tape and a shunt assembly comprising two or more HTS shunt tapes arranged side-by-side across a face of the transport tape. Each of the transport and shunt tapes comprises a substrate layer and an HTS layer of high temperature superconductor (HTS) material, the layers of the shunt tapes extending parallel to the layers of the transport tape.

14 Claims, 7 Drawing Sheets

(56) References Cited

U.S. PATENT DOCUMENTS

2019/0267171 A1    8/2019  Slade

FOREIGN PATENT DOCUMENTS

| JP | 2011222346 A  | 11/2011 |
| JP | 2013503422 A  | 1/2013  |
| JP | 2016534327 A  | 11/2016 |
| WO | 2015011491 A1 | 1/2015  |
| WO | 2018078326 A1 | 5/2018  |

OTHER PUBLICATIONS

International Search Report and Written Opinion for Application No. PCT/EP2020/059638 dated Sep. 30, 2020 (16 pages).
United Kingdom Intellectual Property Office Search Report for Application No. 1904665.5 dated Jul. 24, 2019 (3 pages).

* cited by examiner

HIGH TEMPERATURE SUPERCONDUCTOR CABLE

CROSS-REFERENCE TO RELATED APPLICATION(S)

This application is a national phase entry of PCT/EP2020/059638, filed on Apr. 3, 2020, which claims priority to GB 1904665.5, filed on Apr. 3, 2019, the entire contents of each of which are fully incorporated herein by reference.

TECHNICAL FIELD

The present invention relates to cables for carrying electrical current in a coil of a magnet and comprising high temperature superconductor material. In particular, but not exclusively, it relates to a nuclear fusion reactor comprising a magnetic plasma confinement system comprising a magnet coil wound with such a cable.

BACKGROUND

Superconducting materials are typically divided into "high temperature superconductors" (HTS) and "low temperature superconductors" (LTS). LTS materials, such as Nb and NbTi, are metals or metal alloys whose superconductivity can be described by BCS theory. All low temperature superconductors have a critical temperature (the temperature above which the material cannot be superconducting even in zero magnetic field) below about 30K. The behaviour of HTS material is not described by BCS theory, and such materials may have critical temperatures above about 30K (though it should be noted that it is the physical differences in superconducting operation and composition, rather than the critical temperature, which define HTS and LTS material). The most commonly used HTS are "cuprate superconductors"—ceramics based on cuprates (compounds containing a copper oxide group), such as BSCCO, or ReBCO (where Re is a rare earth element, commonly Y or Gd). Other HTS materials include iron pnictides (e.g. FeAs and FeSe) and magnesium diborate (MgB2).

ReBCO is typically manufactured as tapes, with a structure as shown in FIG. 1. Such tape 100 is generally approximately 100 microns thick, and includes a substrate 101 (typically electropolished hastelloy approximately 50 microns thick), on which is deposited by IBAD, magnetron sputtering, or another suitable technique a series of buffer layers known as the buffer stack 102, of approximate thickness 0.2 microns. An epitaxial ReBCO-HTS layer 103 (deposited by MOCVD or another suitable technique) overlays the buffer stack, and is typically 1 micron thick. A 1-2 micron silver layer 104 is deposited on the HTS layer by sputtering or another suitable technique, and a copper stabilizer layer 105 is deposited on the tape by electroplating or another suitable technique, which often completely encapsulates the tape.

The substrate 101 provides a mechanical backbone that can be fed through the manufacturing line and permit growth of subsequent layers. The buffer stack 102 is required to provide a biaxially textured crystalline template upon which to grow the HTS layer, and prevents chemical diffusion of elements from the substrate to the HTS which damage its superconducting properties. The silver layer 104 is required to provide a low resistance interface from the ReBCO to the stabiliser layer, and the stabiliser layer 105 provides an alternative current path in the event that any part of the ReBCO ceases superconducting (enters the "normal" state).

HTS tapes may be arranged into an HTS cable. An HTS cable, as referred to herein, comprises one or more HTS tapes, which are typically connected along their length via conductive material (normally copper). The HTS tapes may be stacked (i.e. arranged such that the HTS layers are parallel), or they may have some other arrangement of tapes, which may vary along the length of the cable. Notable special cases of HTS cables are single HTS tapes, and HTS pairs. HTS pairs comprise a pair of HTS tapes, arranged such that the HTS layers are parallel. Where substrated tape is used, HTS pairs may be type-0 (with the HTS layers facing each other), type-1 (with the HTS layer of one tape facing the substrate of the other), or type-2 (with the substrates facing each other). Cables comprising more than 2 tapes may arrange some or all of the tapes in HTS pairs. Stacked HTS tapes may comprise various arrangements of HTS pairs, most commonly either a stack of type-1 pairs or a stack of type-0 pairs and (or, equivalently, type-2 pairs).

An important property of a HTS tapes (and superconductors in general) is the "critical current" ($I_c$), which is the current at which the HTS would become normal, at a given temperature and external magnetic field. The characteristic point of the superconducting transition at which the superconductor is considered to have "become normal" is to some extent arbitrary, but it is usually taken to be when the tape generates $E_0=10$ or 100 microvolts per metre. The critical current may depend on a number of factors, including the temperature of the superconductor and the magnetic field at the superconductor. In the latter case, both the field magnitude and the orientation of the superconductor crystal axes in the field are important.

For an HTS cable, assuming the cable is at a uniform temperature and in a uniform magnetic field along its entire length, the critical current of all the tapes in the stack will be relatively uniform. In this case, when the cable is attached to a power supply, current will distribute simply between the tapes in the ratio of the termination resistances at the ends of the cable according to Ohm's law. However, in many circumstances, the current distribution can be affected by a number of factors, such as, if the local magnetic field varies in magnitude, or in field angle relative to the c-axis of the ReBCO layer, either along the length or across the width of the tapes within the cable. Such variations will occur when the cable is wound into a coil for a magnet. For example, in magnet formed from a stack of pancake coils, the cable making up the coils at the ends of the stack may have variations of $I_c$ across the widths of its constituent tapes. The transport current will then flow preferentially in those portions of the width of individual tapes where $I_c$ is highest. In some cases, depending on the local field magnitude and orientation of the cable in the coil, it is possible for the transport current in one or more tapes in the cable to flow mostly along one edge. Therefore the current distribution in the tapes in the cable may depend principally on the shape of the coil.

Temperature variations along the cable also may have an effect on how the current is distributed within the cable, particularly as it may be difficult to provide the right amount of cooling to all sections and/or layers of the cable.

Variations in $I_c$ across a tape or between tapes may lead to current distributions within an HTS cable which for many applications are not optimal. In particular, differences in $I_c$ between different parts of the tape may give rise to screening currents which flow in closed loops within the HTS material. The screening currents are produced to "use up" excess critical current such that all points within the HTS carry the critical current (even in the absence of an external voltage or transport current), as required by the superconducting state. However, screening currents may limit the performance of HTS magnets because only the current that enters and leaves each tape, driven by an externally applied voltage generates a significant magnetic field.

Although the magnetic fields that are generated by the screening currents (or loop "super-currents") are small and fall off quickly with distance from the tape, they may have an adverse effect on magnetic field quality (i.e.: homogeneity and temporal stability). This may be particularly problematic in magnets where the distance from coils to the region where the magnetic field is utilized is small compared to the tape width, e.g.: NMR insert coils or MRI coils, in which the homogeneity of the magnetic field may have to be controlled to better than 0.0001% (in NMR) and 0.001% (in MRI).

In applications which require high magnetic field quality, it is therefore desirable that (a) the current is distributed evenly between the tapes in the stack and (b) uniformly across the width of each tape in the stack.

A partial solution to this problem is provided by "Roebel" cables in which the individual tapes in the stack are cut into a meandering shape and then weaved together. Roebel cables have several disadvantages, however:
 they are wasteful of tape (about 40% is lost punching out the segments from a wider tape to create the meandering shape).
 when wound into a coil and energized, Lorentz forces will cause stress concentrations where the individual tapes cross. These can damage the tapes, reducing local $I_c$.
 Current sharing between the tapes is limited to the locations where they cross over, rather than along the whole length, as in a simple stacked tape cable.

There is therefore a need for an HTS cable which addresses one or more of these problems.

SUMMARY

According to a first aspect of the present invention there is provided a cable for carrying electrical current in a coil of a magnet. The magnet comprises an HTS transport tape and a shunt assembly comprising two or more HTS shunt tapes arranged side-by-side across a face of the transport tape. Each of the transport and shunt tapes comprises a substrate layer and an HTS layer of high temperature superconductor (HTS) material, the layers of the shunt tapes extending parallel to the layers of the transport tape.

The HTS layer of one or more of the shunt tapes may be interrupted by a plurality of discontinuities comprising dropouts and/or full or partial breaks in the HTS layer. The discontinuities may be staggered between adjacent shunt tapes. The discontinuities within each of the one or more shunt tapes may have a regular or semi-regular spacing. The spacing of the discontinuities may differ between the shunt tapes.

The shunt tapes may comprise HTS material which is different from the HTS material in the transport tape.

Two or more shunt tapes may comprise different HTS material from each other.

The HTS and substrate layers of one or more of the shunt tapes may have a different orientation compared to the HTS and substrate layers of the transport tape.

The orientation of the HTS and substrate layers of the shunt tapes may alternate between laterally adjacent shunt tapes.

The shunt assembly may comprise a first shunt layer comprising the two or more shunt tapes and a second shunt layer comprising two or more further shunt tapes arranged side-by-side across the first shunt layer, the layers of the further shunt tapes extending parallel to the layers of the transport tape.

Each shunt tape of the first shunt layer may form a type-0 or type-1 or type-2 pair with an adjacent shunt tape of the second shunt layer.

The stack may further comprise another transport tape adjacent the shunt assembly such that the transport tapes form a stacked pair with the shunt assembly located inside the pair between the two transport tapes.

The transport tapes may be arranged as a type-0 pair such that the respective HTS layers of the pair face each other and are between the respective substrate layers of the pair.

The cable may comprise at least one tape which comprises HTS material which is different from the HTS material of another one of the tapes.

According to a second aspect of the present invention there is provided a cable for carrying electrical current in a coil of a magnet. The cable comprises: a stacked tape assembly of HTS tapes, each HTS tape comprising a substrate layer and an HTS layer of high temperature superconductor (HTS) material. The tape assembly comprises: a transport tape comprising a continuous HTS layer; a shunt assembly comprising one or more shunt tapes, each including a plurality of discontinuities in its HTS layer; and a normally electrically conducting layer between the transport tape and the shunt assembly for allowing electrical current to pass between the transport tape and the shunt assembly. The arrangement of discontinuities in the one or more tapes of the shunt assembly is chosen to direct lateral current distribution in the HTS layer of the transport tape.

According to a third aspect of the present invention there is provided a cable for carrying electrical current in a coil of a magnet. The cable comprises a continuous transport conductor layer comprising high temperature superconducting material, and a shunt structure comprising high temperature superconducting material with non-superconducting barriers to direct a distribution of current in the shunt structure.

The distribution of current in the shunt structure may control a distribution of current in the transport conductor layer.

According to a fourth aspect of the present invention there is provided a magnet coil wound with any of the cables mentioned above.

According to a fifth aspect of the present invention there is provided nuclear fusion reactor comprising a tokamak and a magnetic plasma confinement system comprising the magnet coil.

DETAILED DESCRIPTION

Figure 1:
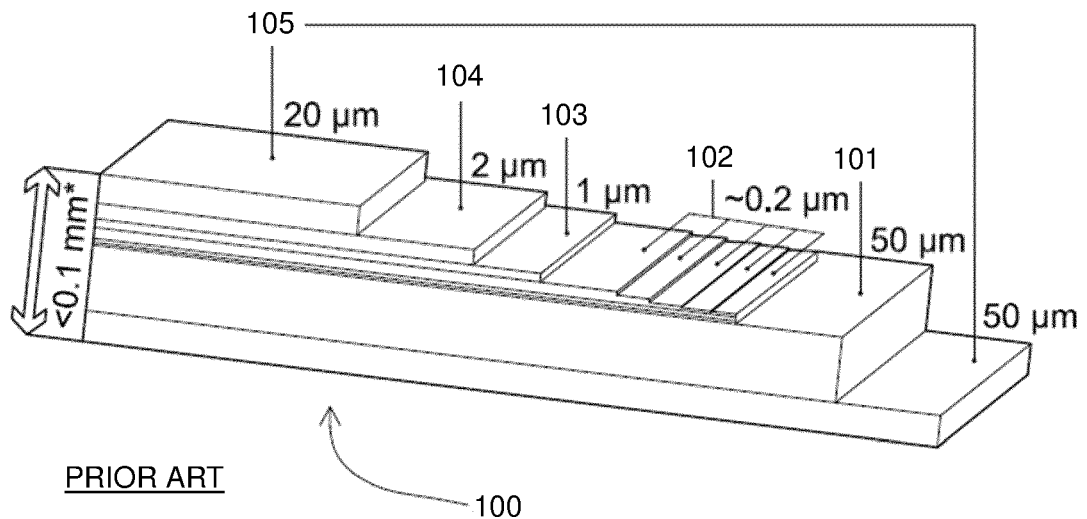
FIG. 1 is a schematic cutaway illustration of an HTS tape.

The present invention relates to an HTS cable comprising stacked HTS tapes that allows the current distribution across the cable width, and between tapes, to be adjusted to create a more uniform current density. This allows HTS magnets to be produced in which the current density is distributed more evenly between tapes and/or which is more uniform across each turn. These properties greatly assist in the design of HTS magnets because the "real-life" performance of the magnet, such as the uniformity of the magnetic field, will more closely resemble what the designer of the HTS magnet had in mind.

The current distribution across the width of the cable can also be adjusted so that it is deliberately non-uniform, with the intention of making the magnetic field angle to the ab-plane of the ReBCO layer in each tape as close as possible to zero. This maximizes the critical current of the cable. As described below, the voltage developed across the HTS cable also provides an early warning of degradation of the cable due to damage to the ReBCO layer, such as cracking (which could result from fatigue due to multiple ramp cycles or thermal cycles, for example), or neutron irradiation.

In one example, the HTS cable may comprise two or more "shunt" HTS tapes sandwiched between a "wound" pair of stacked HTS tapes. The wound pair is a continuous pair of tapes (usually, although not necessarily, a type-0 pair) which has no intentional breaks or $I_c$ dropouts. By contrast, very low but non-negligible resistances are introduced into the shunt HTS tapes at regular intervals. Transport current that exceeds the critical current of the wound pair is forced to share into and distribute between the "internal" shunt HTS tapes. By varying the number and resistances of the distributed resistive connections between shunt HTS tapes, and the "dynamic" (i.e. current dependent) resistance of each shunt tape, the distribution of transport current between the individual tapes along the cable, and across the width of the cable, can be influenced.

The dynamic resistance of an HTS tape is defined as:

$$R(I) = E_0 \frac{h}{I}\left(\frac{I}{I_c(B, T, \theta)}\right)^n.$$

In which:
$E_0$ is the electric field criterion used to define the critical current, typically 10 or 100 μV/m,
h is the length of tape,
I is the transport current in that tape,
$I_c$ is the critical current of the tape (itself a function of magnetic field magnitude B, temperature T and angle (θ) between the vector $\underline{B}$ and the c-axis of the ReBCO crystal), and n is the superconductor n-value, which defines the sharpness of the superconducting to normal transition (n is typically 20 to 50 for ReBCO tapes, but also depends on B and T).

It is therefore possible to adjust the current distribution within the cable by adding $I_c$ dropouts (e.g. regions of lower critical current or regions which, in use, are non-superconducting) or complete cuts at regular intervals along the shunt tapes, and/or by using shunt tapes with different critical current in different parts of the cable. Dropouts can be created by, for example, sharply bending or folding the tape, resulting in local strain induced cracking and $I_c$ degradation in the ReBCO layer. The n-value of the HTS tapes pieces used in the shunt pairs can also be chosen to help achieve a desired current distribution.

Figure 2:
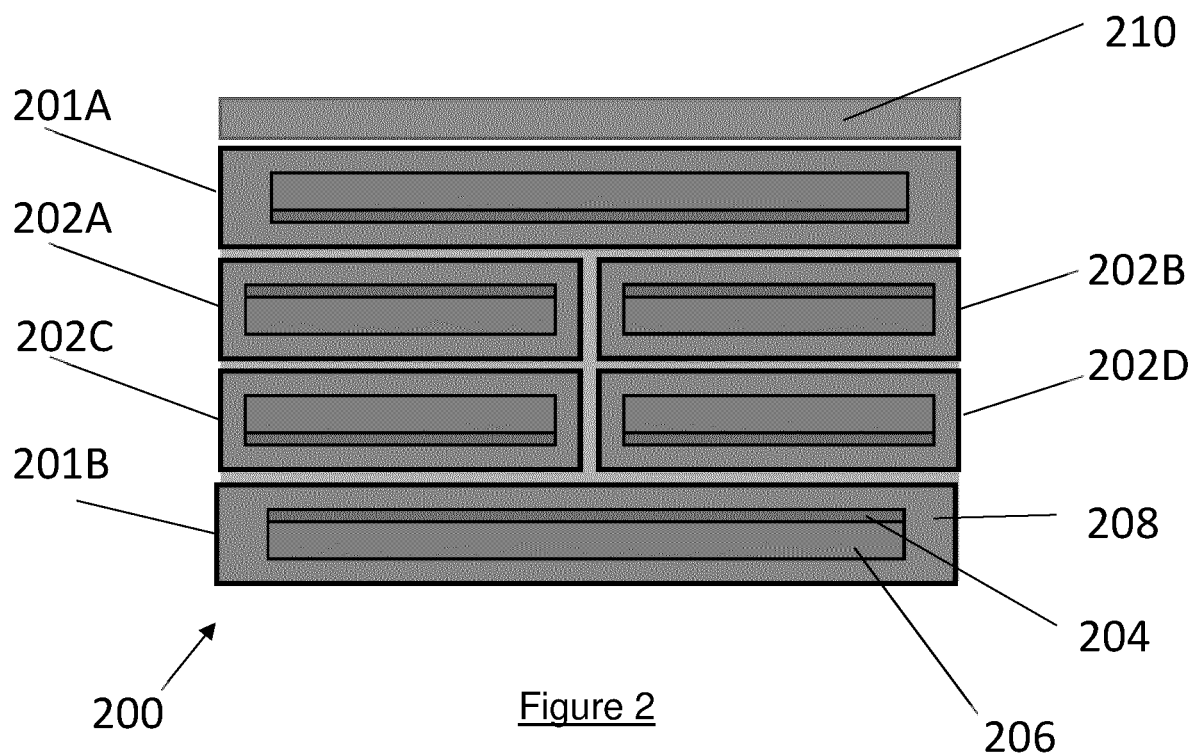
FIG. 2 is a schematic cross section view of an HTS tape.

FIG. 2 shows a cross section through an HTS cable 200 comprising a pair of relatively wide "wound" HTS tapes 201A, 201B arranged as a type-0 pair These can also be considered as "transport" tapes. Between the tapes 201A, 201B of the wound pair are four narrower "shunt" HTS tapes 202A-D in a "2×2" matrix arrangement, i.e. an arrangement with two rows and two columns. Each of the HTS tapes comprises a ReBCO layer 204 on a substrate layer 206, with both layers being surrounded by copper cladding 208. The HTS tapes 202A and 202C are arranged as a type-2 pair, as are the HTS tapes 202B and 202D.

A stabiliser layer 210, made from a metal such as stainless steel, brass or copper, is also added on an outer face of the stacked HTS tapes. The stabiliser layer can be added at any position in the cable or, in some cases, not included at all.

Figure 3:
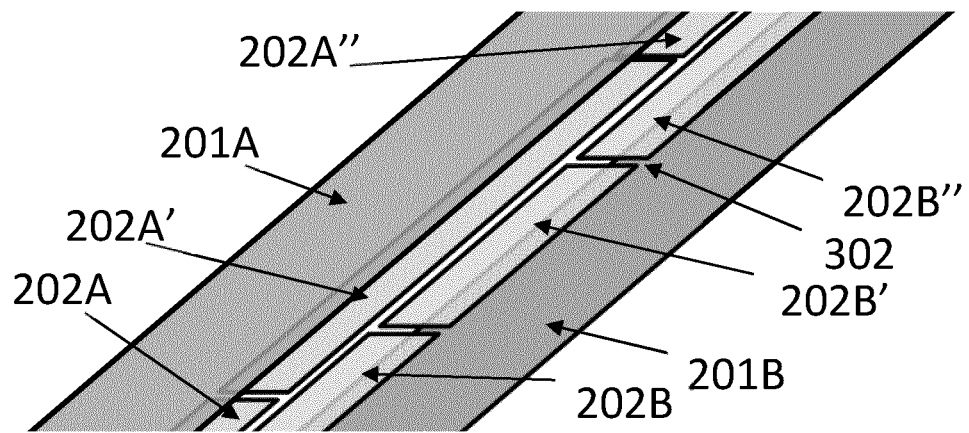
FIG. 3 is a schematic partially exploded perspective view of the HTS tape of FIG. 2.

FIG. 3 shows a partially exploded perspective view of some of the layers of HTS cable 200 (tapes 202C-D are omitted for clarity). The outermost wound tapes 201A-B are continuous, whilst the shunt tapes 202A-B each have a regular series of breaks 302 along their length. The breaks are arranged in the shunt tapes 202A-B so that the breaks in the two tapes do not coincide longitudinally with each other and, in the example shown, have a different spacing. By contrast, the wound HTS tapes 201A, 201 B have no intentional breaks or $I_c$ dropouts, so when wound into a coil these tapes present a continuous spiral superconducting path with zero resistance.

For ease of reference in the following discussion, the tapes are grouped into lateral pairs denoted S1 (shunt tapes 202A-B), S2 (shunt tapes 202C-D) and W (tapes 201A-B). The shunt HTS tapes are therefore considers as pairs within each row, rather than within each column, as was the case when discussing the arrangement in terms of type-0 pairs.

The tapes of shunt pairs S1 and S2 have different critical currents $I_{C,S1}$ and $I_{C,S2}$, from each other and from the tapes of the W pair, which each have a critical current $I_{C,W}$.

When the cable is supplied with an increasing current $I_0$, the W pair will carry all the current until $I_0$ approaches its critical current $2*I^{C,W}$. The cable will then then generate enough voltage to shed excess current ($I_0 - 2*I_{c,w}$) to the shunt tapes. This excess current will split between the shunt tapes according to the local resistances through the normal metal (i.e. non-HTS material) between the tapes, which is influenced by the dynamic resistance of the tapes and by the spacing of the discontinuities or interruptions (dropouts) along the tapes.

Figure 4:
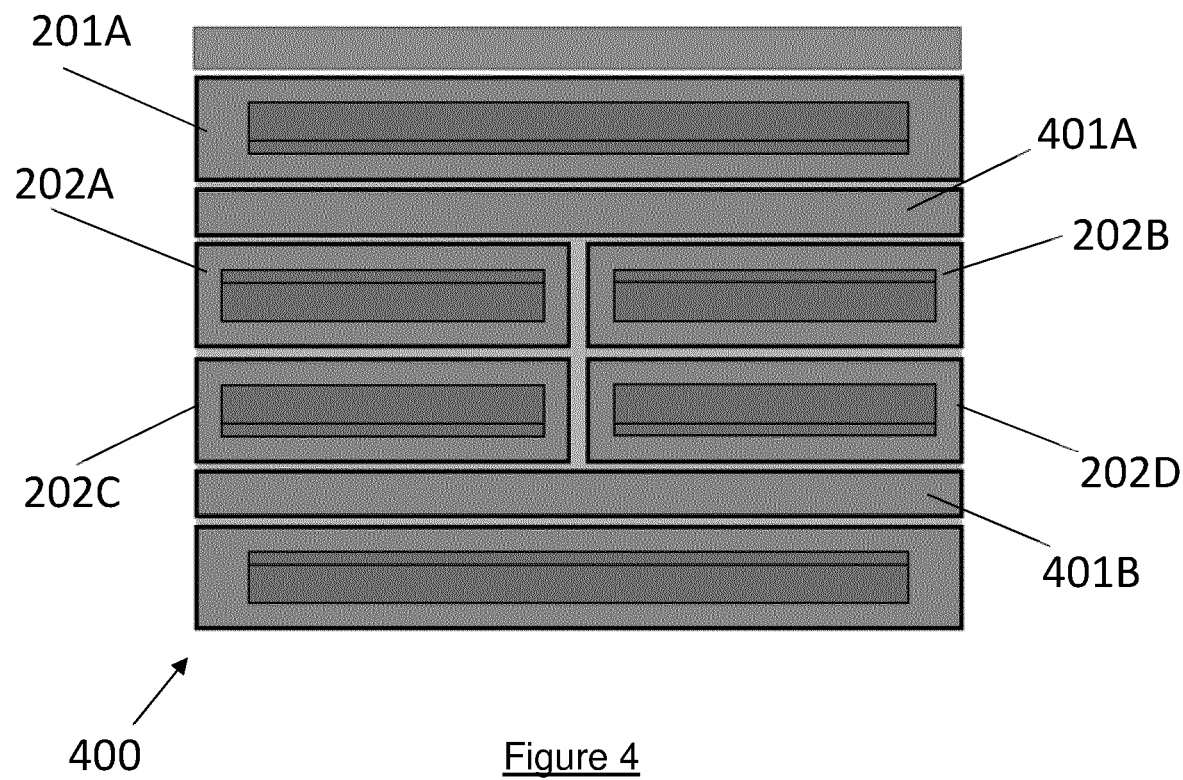
FIG. 4 is a schematic cross section view of an HTS tape.

FIG. 4 is similar to FIG. 2, except that the HTS cable 400 comprises an additional stabiliser layer 401A located between HTS tape 201A and the S1 shunt pair comprising tapes 202A-B) and an additional stabiliser layer 401B located between HTS tape 202A and the S2 shunt pair comprising tapes 202C-D. In this example, the additional stabiliser layers are formed from copper although other metals (or alloys) and other conductive materials can also be used. One or more such additional stabiliser layers can be included at any position within the HTS cable 400, but preferably between the type-0 pairs formed by the W, S1 or S2 HTS tapes A further advantage of the HTS cables described herein is that different HTS tapes (i.e. tapes with different HTS material or with different superconducting properties) can be incorporated into a single cable. This allows, for example, HTS tapes from different suppliers to be used to make a single cable, which is particularly important for the construction of large magnet coils for which a single cable supplier may not be able to supply enough HTS tape.

The HTS cables described herein also may allow for increased critical currents by forcing currents to distribute evenly between the tapes using a combination of (a) choosing the length of the individual HTS tape pieces in each "lane" (e.g. the length of tape pieces 202A, 202A' and 202A") and (b) choosing the tape manufacturer (based on the critical current) in each lane, and/or (c) choosing the width of the shunt HTS tapes 202A-D.

Many permutations and combinations of the internal shunt tapes are possible.

Figure 5:
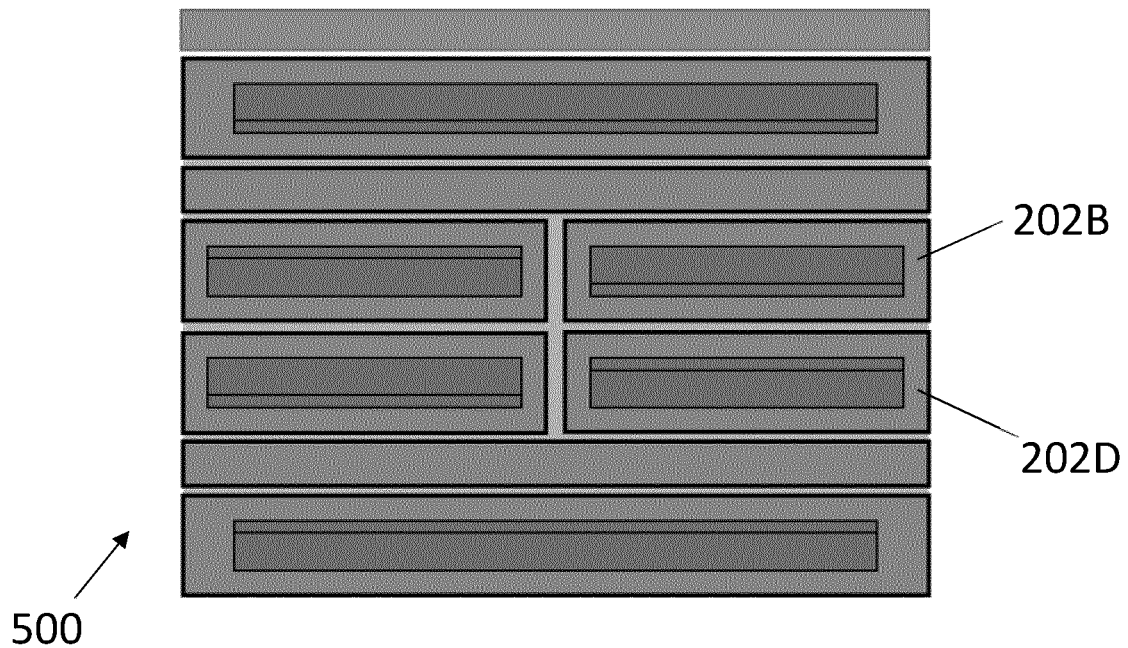
FIG. 5 is a schematic cross section view of an HTS tape.

FIG. 5 is similar to FIG. 4, except that two of the HTS shunt tapes 202B and 202D of the HTS cable 500 are arranged as a type-0 pair.

Figure 6:
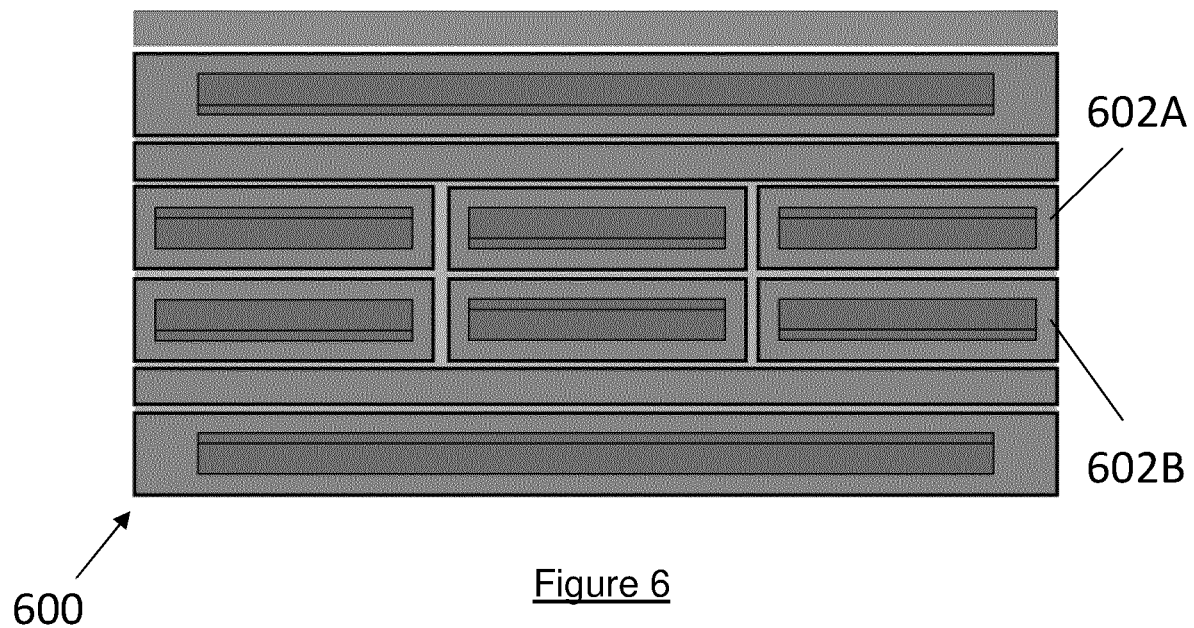
FIG. 6 is a schematic cross section view of an HTS tape.

FIG. 6 is similar to FIG. 5, except that the HTS cable 600 comprises two further shunt HTS tapes 602A and 602B arranged as a type-2 pair, such that the orientation of the shunt HTS tapes (i.e. which of the HTS layer and the substrate layer is uppermost) alternates from left to right across the HTS cable 600. In this example, the shunt HTS tapes are arranged as a 2×3 matrix (i.e. there are two rows and 3 columns). However, in general shunt HTS tapes forming a matrix with any number of row or columns can be used, i.e. an n×m matrix arrangement. Typically, the width of the transport HTS tapes 201A, 201B is an integer multiple of the width of the shunt HTS tapes, so that an integer number of shunt tapes can be provided across the face of the transport HTS tapes.

Figure 7:
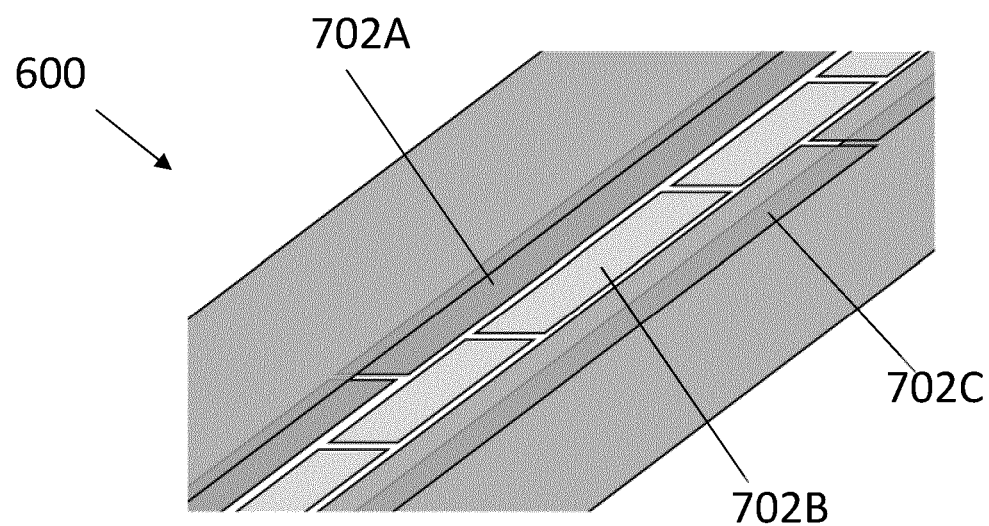
FIG. 7 is a schematic partially exploded perspective view of the HTS tape of FIG. 6.

FIG. 7 is similar to FIG. 3, except that the HTS cable 600 of FIG. 6 is shown. The stabiliser layers are omitted for clarity. The three (columnar) pairs of shunt HTS tapes are denoted 702A, 702B and 702C. The inner pair of shunt HTS tapes 702B has a smaller break spacing than the break spacing of the outer pairs of shunt HTS tapes 702A, 702C. This forces current to flow preferentially in the outer pairs 702A, 702C, as the outer pairs have a higher critical current than the inner pair 702B, since the dynamic resistance for certain ranges of transport currents in the outer pairs 702A, 702C will be lower. This, in turn, causes more current to flow at the edges of the transport tapes 201, 201B than in the middle.

By forcing current to distribute preferentially at the edges of the cable, the current capacity of the cable can be increased because the component of magnetic field perpendicular to each tape is reduced. This is generally beneficial, allowing a coil with the same amount of HTS to generate a higher magnetic field (at a higher transport current), before hotspots (due to local overloading) cause a thermal runaway and consequent quench of the magnet.

In all of the examples describe above, the HTS cable may be wound into a coil using full insulation, partial (e.g. "leaky") insulation, or no insulation in between the windings. In a tokamak (as described below), the toroidal field (TF) coils would be wound with partial insulation (to provide optimum quench protection with acceptable ramp time), and the poloidal field (PF) coils with full insulation (to provide minimum ramp time and predictable alternating current, AC, behaviour, at the expense of a faster quench detection method being required).

One important application of HTS cables (such as those described above) is in a type of fusion reactor known as tokamak. A tokamak features a combination of strong toroidal magnetic field, high plasma current and, usually, a large plasma volume and significant auxiliary heating, to provide hot, stable plasma. This allows tokamaks to generate conditions so that fusion can occur. The auxiliary heating (for example via tens of megawatts of neutral beam injection of high energy hydrogen, deuterium or tritium) is necessary to increase the temperature to the sufficiently high values required for nuclear fusion to occur, and/or to maintain the plasma current.

The magnet coils on a tokamak can be divided into two groups. The poloidal field coils are horizontal circular coils wound with their centre lying on the central column of the tokamak, and produce a poloidal field (i.e. one which is substantially parallel to the central column). The toroidal field coils are wound vertically through the central column, and around the outside of the plasma chamber (the "return limbs") to produce a toroidal field (i.e. one which is circular around the central column). The combination of the poloidal and toroidal fields produces a helical field within the plasma chamber which keeps the plasma confined.

The amp-turns required to generate the toroidal field are very large. Designs for tokamaks therefore increasingly involve the use of superconducting materials in the field coils. For a compact spherical tokamak, the diameter of the central column should be as small as possible. This presents conflicting requirements, as the current density which can be achieved, even with superconducting materials, is limited.

The HTS cables described herein are particularly suitable for use in tokamaks, in particular spherical tokamaks, e.g. to produce either of (or both) the poloidal or toroidal fields.

FIGS. 8 to 11 illustrate a problem with toroidal field (TF) magnets, such as those used in a tokamak, which comprise an arrangement of double pancake coils around a central column.

Figure 8:
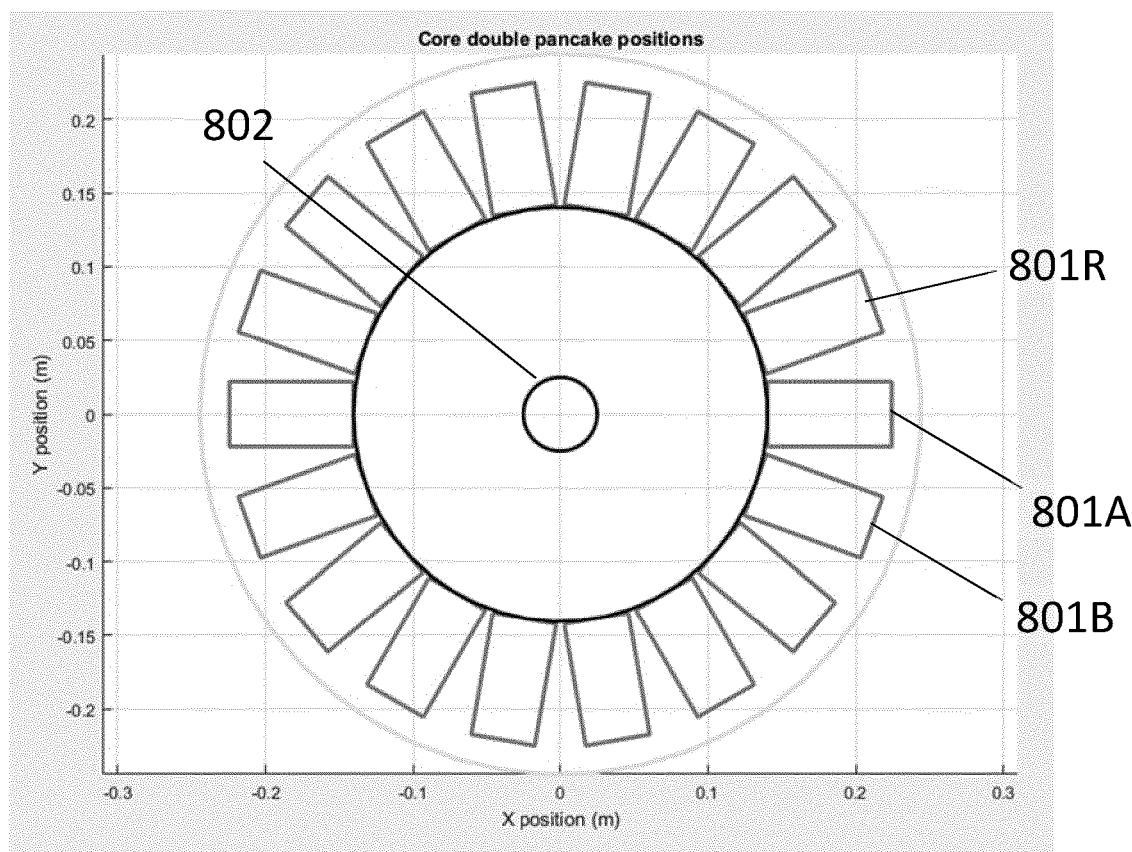
FIG. 8 is a schematic cross section top view of a centre column of a toroidal field magnet comprising HTS tape.

FIG. 8 shows a cross section through a TF magnet in which double pancake coils 801A-R are arranged uniformly around the centre column 802. Each double pancake coil 801A-R is arranged so that its axis lies in the plane of the figure so that when current flows in turn through each of the double pancake coils 801A-R a toroidal magnetic field is produced.

Figure 9:
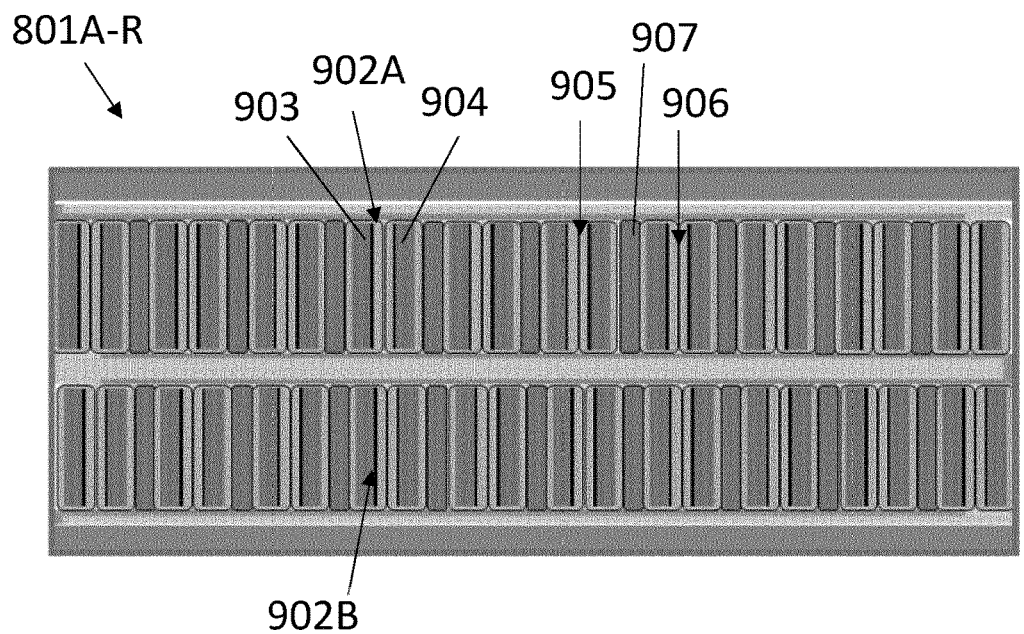
FIG. 9 is a schematic cross section of one of the double pancake coils of the toroidal field magnet of FIG. 8.

FIG. 9 shows a close-up view of a radial section of one of the double pancake coils 801A-R. Each double pancake coil 801A-R is formed from two pancake coils 902A, 902B wound in opposite directions around a common axis (not shown) and stacked face-to-face. Each coil 902A, 902B is formed of HTS cable consisting of stacked HTS tapes in a type-0 arrangement, i.e. a "conventional" HTS cable as described in the Background section above. Adjacent windings 905, 906 of the HTS cable are separated from one another by a partially insulating layer 907.

Figure 10:
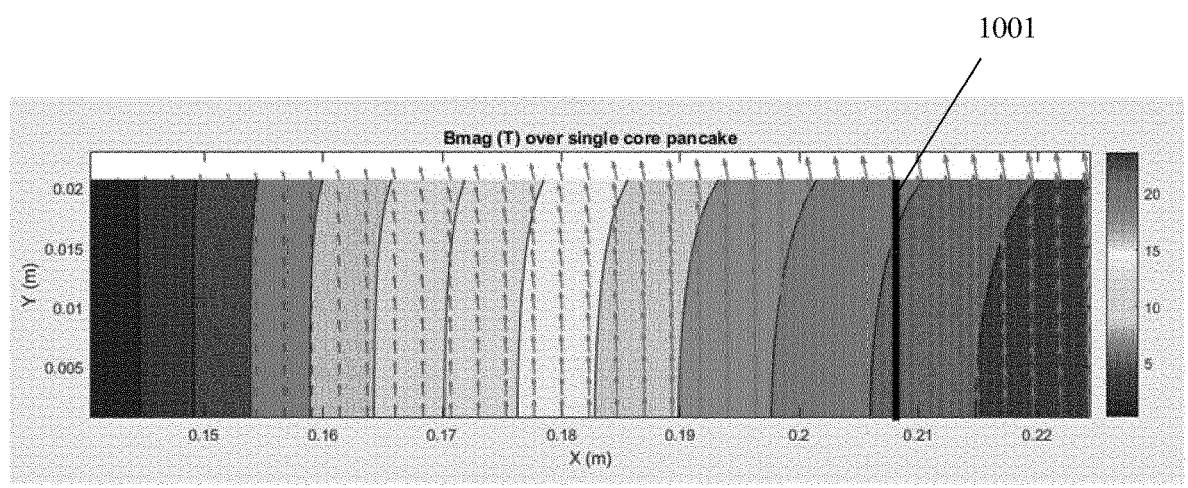
FIG. 10 is a vector plot of the magnetic field (B) and a contour plot of the magnitude of the magnetic field (B) calculated for a cross section of one of the pancake coils of FIG. 9.

FIG. 10 shows the results of a calculation of the magnetic field within one of the (single) pancake coils 902A, 902B. The X and Y axes of the figure, show respective radial and axial distances within the coil. The contours show the magnetic field magnitude, |B| within the coil. Line 1001 marks the position of an exemplary winding of the coil 902A, 902B. The direction of the arrows shown in the figure indicates the deviation of the magnetic field (B) vectors from being parallel to line 1001.

Figure 11:
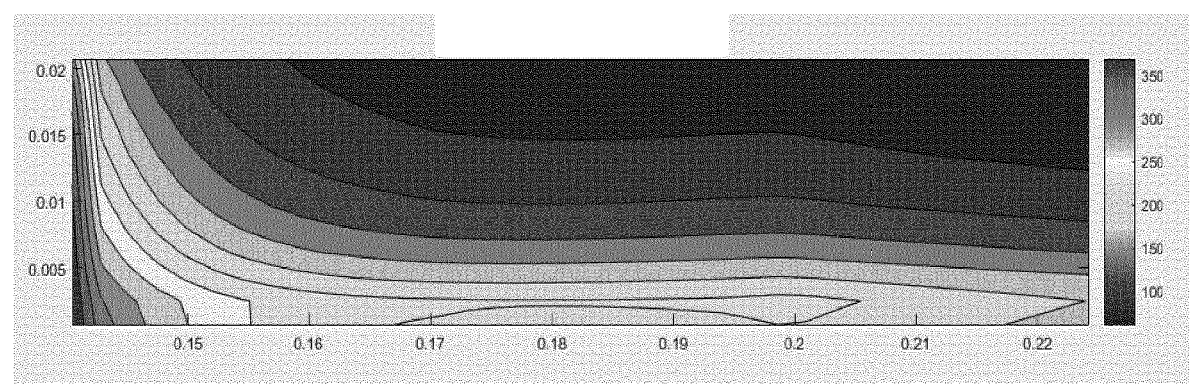
FIG. 11 is a contour plot of the critical current ($I_c$) calculated for the cross section of the pancake coil of FIG. 10.

FIG. 11 is similar to FIG. 10, except that the results of a calculation of the critical current are shown. For the purposes of calculating the field generated by the tape, each tape is split into 12 strips, with critical current for a single strip summed over all shunt tapes in the turn). The calculation of the critical current assumes that the current is uniform across the tape. However, this assumption may not always be valid because, in practice, the current is re-distributed across the tapes (i.e. along the X axis) to achieve a uniform ratio of the current to the critical current, i.e.

$$\frac{I(x)}{I_c(B(x), T, \theta(x))} \approx \text{constant.}$$

The calculation of the critical current distribution can therefore be improved using an iterative procedure in which the current distribution, I(x), is re-calculated using the approximate critical current distribution, $I_c(x)$ shown in FIG. 11. This process can be repeated iteratively until both current distributions no longer change. The results shown in FIG. 11 therefore represent only the first iteration.

FIG. 11 can be understood with reference to the calculated magnetic field shown in FIG. 10. The critical current is highest at the inner radius, where the magnetic field is near zero, but rapidly falls at larger radii (X position) and B increases. The critical current also varies across the width of the coil (Y position) principally due to the change in field angle from approximately parallel to the tapes (and hence to the ab-plane of the ReBCO layer) in the HTS cable at the lower edge of the pancake (y=0), to a few degrees off at the upper edge (y=20 mm). In use, transport current will flow in the tape in proportion to the $I_c$ distribution. Therefore, the inhomogeneity of the magnetic field strength and direction within the coil 802A, 802B gives rise to a tendency for current to "hog" the inner edges of the pancake coils.

This problem can be addressed by replacing the "conventional" HTS cable with an HTS cable similar to those described above in relation to FIGS. 2-7. The discontinuities (i.e. dropouts, or cuts or changes in $I_c$) in the shunt HTS tapes are chosen to make a larger proportion of transport current flow in the shunt HTS tapes on one side of the cable. This allows the double pancake coils 801A-R to carry more current before quenching.

A further advantage of the HTS cables described herein involves monitoring $I_c$ degradation of the HTS tapes, such as might be caused by neutron damage in a fusion reactor, or fatigue from thermal or magnetic field cycling. In particular, early warning of $I_c$ degradation can be provided, which is of great benefit in, for example, large tokamak coils (both PF and TF).

Figure 12:
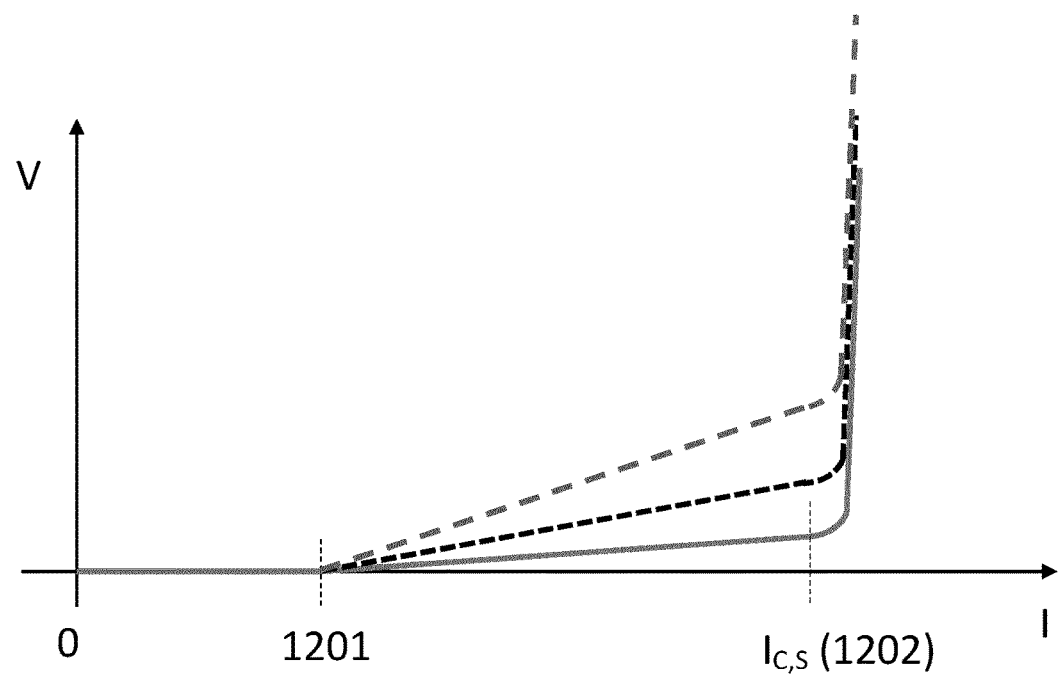
FIG. 12 is a graph showing I-V curves for HTS tapes comprising shunt tapes with differently spaced cuts.

FIG. 12 shows I-V (current-voltage) curves for the HTS cable 200 shown in FIG. 2. Each curve is for a different spacing between complete cuts in the shunt HTS tapes. Closer spacing means more resistance and hence a larger gradient (dV/dl).

Below a current of $2*I^{C,W}$, 1201 (the combined critical current of the wound W pair), the cable 200 generates negligible voltage, as it has negligible resistance. For transport current (I) in the range $2*I_{C,W}(1201)<I<2*I_{C,W}+4*I_{C,S}$ (1202), where $4*I_{C,S}$ is the combined critical current of the two S pairs (S1 and S2), the cable displays a constant resistance, and hence develops a voltage proportional to I. For $I>2*I_{C,W}+4*I_{C,S}$ (1202) the cable shunts excess current into the normal (i.e. non-superconducting) metal stabilizer 210, which will eventually lead to a quench (thermal runaway), as the Joule heating reduces the critical currents of the HTS tapes in the cable.

With reference to FIG. 12, for monitoring purposes, the cable is designed to run at a constant transport current somewhere between 1201 and 1202, i.e. between the combined Ic of wound tapes, and the combined $I_c$ of the shunt tapes. At this transport current the cable is slightly resistive. It therefore dissipates some power as heat. If the critical current of the cable (either W or S pairs) is degraded, this dissipation will increase slightly, resulting in a rise in temperature until a new thermal equilibrium is reached (wherein the increased heat generation is equal to the increased cooling power available at a raised temperature). This temperature rise can be detected by monitoring the temperature of the cable, at many points distributed across the coil. A slow rise in temperature therefore provides an indication of a drop in critical current, and therefore can be used a very early warning of a possible quench (thermal runaway) coming at some (indeterminate) time in the future.

Figure 13:
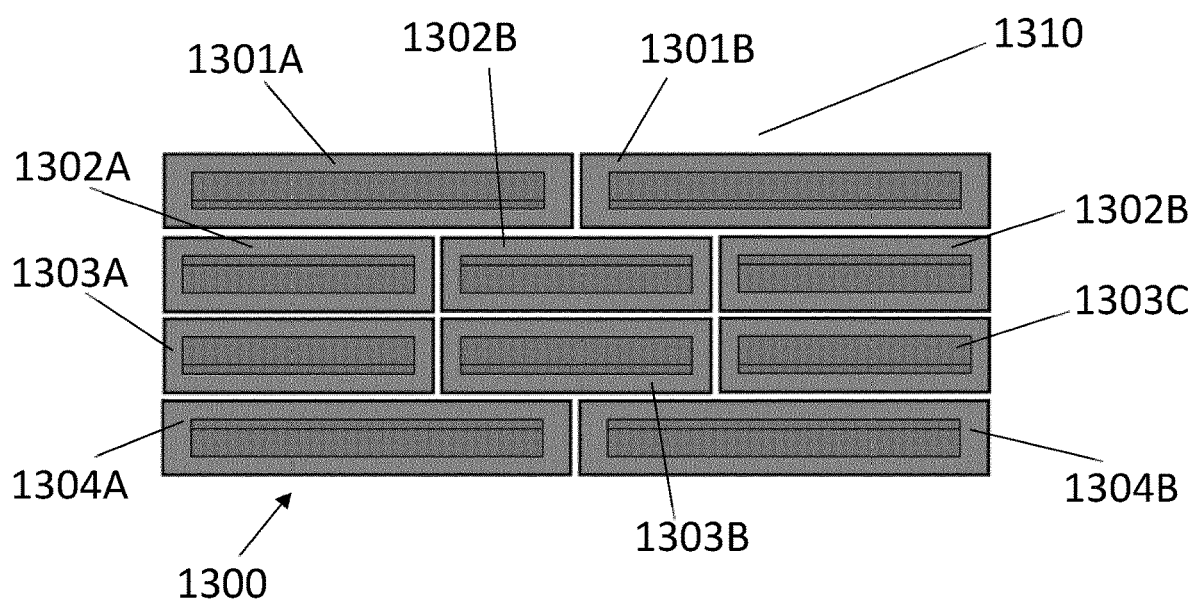
FIG. 13 is a schematic cross section view of an HTS tape.

FIG. 13 shows a cross section through an HTS cable 1300 that is similar to HTS cable 600 (see FIG. 6), except that there are now four "transport" HTS tapes 1301A, B and 1304A,B (rather than two as in HTS cable 600). The transport HTS tapes are arranged in two layers, the layers being separated from one another by six narrower "shunt" HTS tapes 1302A-C, 1303A-C arranged as for HTS cable 600, i.e. in 2×3 matrix. The transport HTS tapes 1301A,B and 1304A,B in each layer are arranged side by side, with the HTS layers of each transport HTS tape towards the shunt HTS tapes, thereby creating two type-0 pairs of HTS transport tapes 1301A, 1304A and 1301B, 1304B. The middle shunt HTS tapes 1302B, 1303B each span two of the HTS transport tapes.

The HTS cable 1300 has double the width of the transport HTS tapes 1301A,B, 1304A,B. Wider HTS cables can be constructed by adding more type-0 pairs of transport HTS tapes and increasing the number of shunt HTS tapes accordingly, i.e. adding extra columns of shunt HTS tapes or increasing the width of one or more of the shunt HTS tapes 1302A-C, 1303A-C to span the transport HTS tapes.

Wider HTS cables, such as HTS cable 1300, are particularly beneficial for use in TF magnets used in tokamaks because they enable double pancake coils 801A-R of a particular height (size along the axis of the coil) to be constructed from relatively narrow HTS tapes, i.e. fewer coils need to be stacked axially to obtain a given height of double pancake coil. Therefore, fewer joints (i.e. electrical connections) between coils are needed, so manufacturing is more simplified and there are fewer "weak points" for failure. Additionally, the overall resistance of a TF coil constructed from a stack of many narrow pancake coils compared to a TF coil with fewer (e.g. 2) wider pancake coils is more evenly distributed in the latter.

In some cases, the wider HTS cables may allow a single TF limb to be constructed from only two coils, which is particularly advantageous because the two pancake coils in each limb 801A can be arranged so that current flows spirally from the inner diameter of one pancake coil to its outer diameter, through a joint between the pancake coils (which is easily accessible as it is on the outer diameter of the pancake coils) and then spirally back from the outer diameter of the other pancake coil to the inner diameter of the other pancake, and then into the next limb 801B through a "limb-limb" joint between the double pancake coils 801A, B. The limb-limb joint is located on the inner diameter of the pancake coils and away from the TF centre column 802, which facilitates making, repairing or testing the joint.

A further advantage to having fewer (e.g. 2) stacked coils is that it reduces the inductance of the pancake coil 801A-R (relative to the inductance of a stack with more coils). A lower inductance, L, coil has potential advantages: (a) reduced voltage during ramping (V=L·dI/dt), (b) reduced voltages are generated during rapid de-energization, as required for quench protection.

While various embodiments of the present invention have been described above, it should be understood that they have been presented by way of example, and not limitation. It would be apparent to one skilled in the relevant art(s) that various changes in form and detail could be made therein without departing from the spirit and scope of the invention.

The invention claimed is:

1. A cable for carrying electrical current in a coil of a magnet, comprising:
   an HTS transport tape having a width and a length, the length being longer than the width; and
   a shunt assembly comprising two or more HTS shunt tapes extending along a face of the transport tape, the HTS shut tapes arranged side-by-side across the width of the transport tape;
   wherein each of the transport and shunt tapes comprises a substrate layer and an HTS layer of high temperature superconductor, HTS, material, the layers of the shunt tapes extending parallel to the layers of the transport tape, and
   wherein the HTS layer of one or more of the shunt tapes is interrupted by a plurality of discontinuities, the discontinuities comprising dropouts and/or full or partial breaks in the HTS layer and the face of the HTS transport tape extends across each of the plurality of discontinuities.

2. A cable according to claim 1, wherein the discontinuities within each of the one or more shunt tapes have a regular or semi-regular spacing.

3. A cable according to claim 2, wherein the spacing of the discontinuities differs between the shunt tapes.

4. A cable according to claim 1, wherein the HTS and substrate layers of one or more of the shunt tapes has a different orientation compared to the HTS and substrate layers of the transport tape.

5. A cable according to claim 4, wherein the orientation of the HTS and substrate layers of the shunt tapes alternates between laterally adjacent shunt tapes.

6. A cable according to claim 1, wherein the shunt assembly comprises a first shunt layer comprising the two or more shunt tapes and a second shunt layer comprising two or more further shunt tapes arranged side-by-side across the first shunt layer, the layers of the further shunt tapes extending parallel to the layers of the transport tape.

7. A cable according to claim 6, wherein each shunt tape of the first shunt layer forms a type-0 or type-1 or type-2 pair with an adjacent shunt tape of the second shunt layer.

8. A cable according to claim 1, wherein the cable further comprises another transport tape adjacent the shunt assembly such that the transport tapes form a stacked pair with the shunt assembly located inside the pair between the two transport tapes.

9. A cable according to claim 8, wherein the transport tapes are arranged as a type-0 pair such that the respective HTS layers of the pair face each other and are between the respective substrate layers of the pair.

10. A cable according to claim 1, wherein the discontinuities are staggered between adjacent shunt tapes.

11. A cable according to claim 1, wherein the shunt tapes comprise HTS material which is different from the HTS material in the transport tape.

12. A cable according to claim 1, wherein two or more shunt tapes comprise different HTS material from each other.

13. A cable according to claim 1 and comprising at least one tape which comprises HTS material which is different from the HTS material of another one of the tapes.

14. A cable for carrying electrical current in a coil of a magnet, comprising:
    a stacked tape assembly of HTS tapes, each HTS tape comprising a substrate layer and an HTS layer of high temperature superconductor, HTS, material, the tape assembly comprising:
    a transport tape comprising a continuous HTS layer, the transport tape having a width and a length, the length being longer than the width;
    a shunt assembly comprising one or more shunt tapes, each including a plurality of discontinuities in its HTS layer, the one or more shunt tapes arranged side-by-side across the width of the transport tape; and
    a normally electrically conducting layer between the transport tape and the shunt assembly for allowing electrical current to pass between the transport tape and the shunt assembly;
    wherein the face of the HTS transport tape extends across each of the plurality of discontinuities and the arrangement of discontinuities in the one or more tapes of the shunt assembly is chosen to direct lateral current distribution in the HTS layer of the transport tape.

* * * * *